Patented Aug. 19, 1941

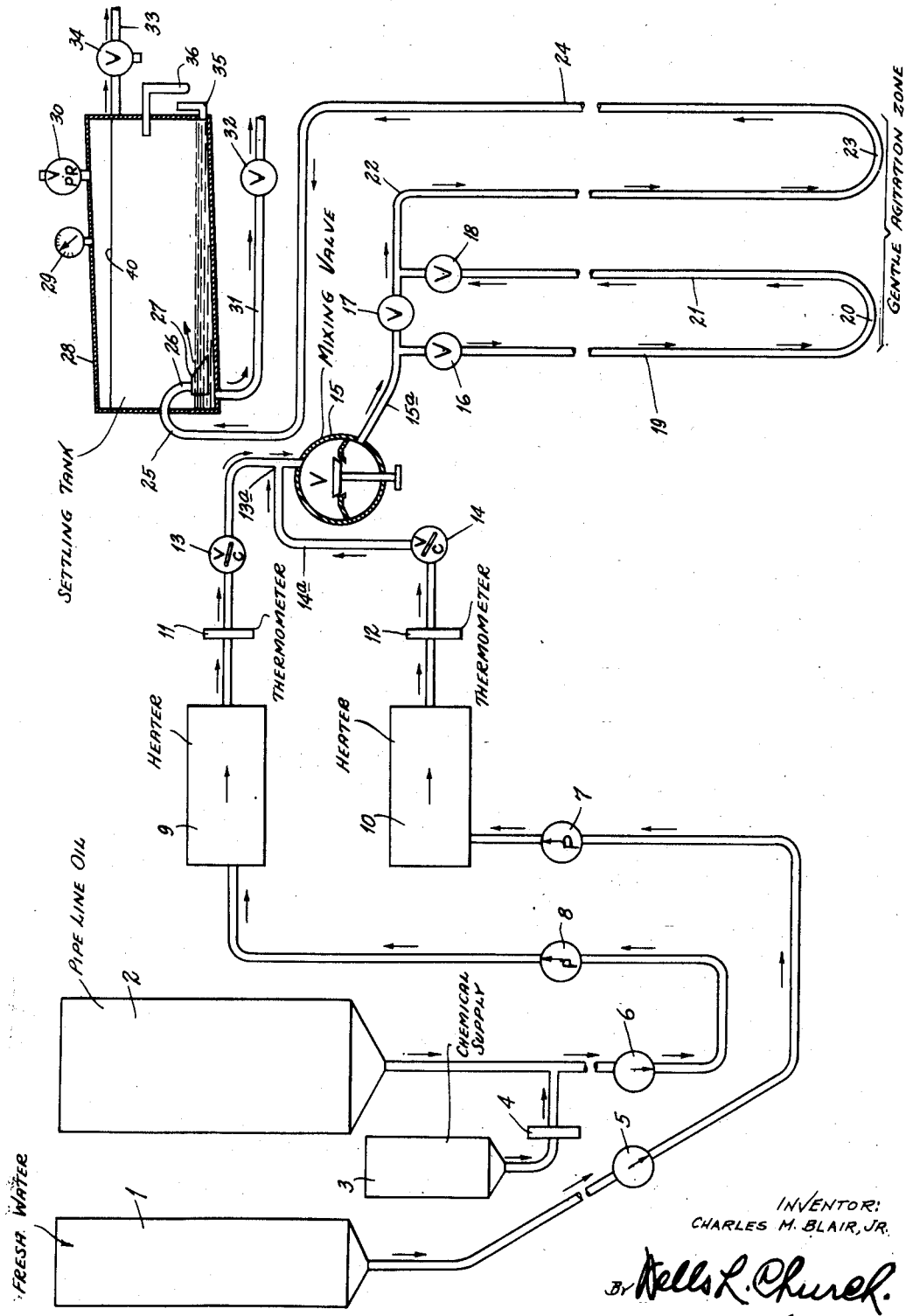

2,252,959

UNITED STATES PATENT OFFICE

2,252,959

PROCESS FOR TREATING PIPE-LINE OIL

Charles M. Blair, Jr., Webster Groves, Mo., assignor to Petrolite Corporation, Ltd., Wilmington, Del., a corporation of Delaware Application May 31, 1940, Serial No. 338,107

7 Claims. (Cl. 252—348)

This invention relates to the treatment of petroleum oils for the purpose of removing or reducing the amount of certain objectionable substances in same, my present application being a continuation, in part, of my application Serial No. 291,879, for Process for removal of water-soluble impurities from crude petroleum, filed August 25, 1939.

The main object of my invention is to provide a practicable process for removing water-soluble impurities, particularly dissolved inorganic salts from petroleum, topped oils, and crude fractions obtained by distillation.

The production of crude oil generally is accompanied by the production of naturally-occurring brines, and such brines are usually suspended or emulsified in the crude oil. In many cases such suspended brine will settle out rapidly on permitting the emulsion to stand quietly. In other cases, however, the brine is so thoroughly emulsified in the oil, that a separation will not take place, even on prolonged standing. Such oil is commonly referred to as cut oil, roily oil, emulsified oil, etc., and represents an emulsion of the water-in-oil type.

Before such oil becomes marketable, its content of emulsified water or brine must be reduced to a relatively low value. The upper limit for such water or brine content is usually 2%, but is more apt to be 1% or 0.5%, or slightly less. Such dehydrated oil is commonly referred to as "pipeline oil," since it meets the specifications set by the purchasing companies. The water, per se, present in the small amount of residual emulsion contained in the oil does not appear to be particularly objectionable in its effect on refining equipment or other equipment involved in its handling. However, in the great majority of cases the residual emulsion contained in the pipeline oil does not consist of pure water, but is composed of an aqueous solution of inorganic salts, which was originally produced with the crude oil when it emerged from the ground. It has been found that such salts accompanying the oil are generally very objectionable to the refiner of the petroleum, and that it becomes extremely desirable to remove these impurities prior to further refining steps.

The presence of such inorganic salts in crude petroleum leads to two principal troubles, i. e., stoppage of flow or restriction of flow, and corrosion; and these combine to result in effects such as plugging of heat exchangers, decreased heat transfer, increased replacement costs, accelerated coke formation, lowered quality of products, lowered yields of valuable products and greater labor requirements.

Numerous attempts have been made to remove this residual salt, particularly that in the form of emulsified brine, from petroleum. On first sight, it might appear that this could be accomplished by applications of methods commonly employed for treatment of ordinary emulsified oil in the field. However, the conditions obtaining in the refinery where the salt removal operation is usually carried out are generally different from those obtaining in the oil field, where the emulsion, as originally produced, is dehydrated down to the pipeline requirements. In the latter case the emulsion may contain a large percentage of dispersed water or brine; whereas, pipeline oil, considered as an emulsion, is apt to contain only a few tenths of a percent of water as the dispersed phase, and very seldom over 2%. In the average field dehydration plant the daily capacity is usually sufficiently small to permit very long settling times, perhaps as much as twenty four hours or more; whereas, in the refinery the daily capacities are much higher and usually sufficient space is not available to permit more than two hours settling time, and often one hour or less is the longest settling period available. Pipeline oil, as a rule, represents an aged emulsion which is usually weeks old and may be months or even years old. As a result, the dispersed particles in this emulsion are highly stabilized and difficult to resolve. Furthermore, these aged emulsion particles have previously been subjected to the action of some demulsifying means when the oil was originally treated in the field, and having come thru such treatment, must represent the more refractory and less resolvable portion of the original emulsion.

The removal of inorganic salts from pipeline oil, in other ways, differs markedly from the ordinary field dehydration of cut oil or roily oil. In the latter case the operation results in the conversion of a non-marketable material into a marketable one, and consequently, this operation will justify a relatively high cost. In removal of water-soluble impurities from the pipeline oil, the change brought about is one of degree, rather than of kind, and the justified expense is relatively small.

Since the water-soluble impurities contained in pipeline oil generally occur in the form of an aqueous solution in the remaining few tenths of a percent of emulsified water, it is clear then that the problem of the removal of these impurities can be solved, at least theoretically, by the removal of this remaining emulsified water. Numerous methods have been proposed and employed for effecting this removal. The simplest methods proposed have involved mechanical operations, such as sedimentation or filtration, or a combination of these; but such methods are generally unsatisfactory, due to the fact that the small amount of residual emulsion contained in the oil usually consists of extremely fine droplets, often less than $10^{-4}$ cm. in diameter; and as a result, the rate of sedimentation is extremely small, and the rate of coalescence to form droplets of larger size is also small. Filtration procedures usually result in rapid clogging of the filtering medium, involving frequent replacement and its attendant expense. Such methods have found very limited application in actual practice.

It appears to be extremely difficult to remove the last tenth of a percent or so of emulsified brine from a petroleum oil by any common means of demulsification, be it mechanical, electrical, or chemical. Yet, the amount of inorganic salts which can be carried by even 0.1% of emulsified brine may be much more than enough to cause serious difficulties during the refining process.

Mechanical procedures have also been proposed for use in connection with the introduction or dispersion of fresh water in the oil in predetermined amounts to act as a washing medium for removal of water-soluble impurities. However, on dispersing or mixing water with oil it generally becomes emulsified, due to the presence of emulsifying agents commonly occurring in the oil, and the problem of removal of both the original emulsion particles and the added salt-free water arises. Here again, the rate of sedimentation of particles is generally too small to permit successful operation, and due to the protective action of the emulsifying agent in the petroleum, coalescence of drops is prevented or reduced. Where a filtration procedure is employed, the filter rapidly becomes clogged with emulsion particles, which results in stoppage of the flow and necessitates careful attention and frequent replacement of the filtering medium.

One method which has been proposed and employed is to use an electrical dehydrator of the kind commonly employed in the resolution of cut oil to separate the prepared emulsion of predetermined water content, as previously described. In many instances, the adoption of the electrical dehydration process is eminently satisfactory, but it involves an added expense in the cost of an electrical dehydrator, and often requires the attention of a skilled operator to obtain uniformly successful results.

Another procedure which has been proposed is to subject an emulsion or dispersion of a predetermined amount of fresh water in the pipeline oil to the action of a chemical demulsifier of the kind ordinarily used in resolution of roily oil or cut oil, followed by a settling period so as to permit sedimentation of the water particles. Such procedure, although it represents the simplest operative steps, in that no expensive apparatus must be purchased, and in that no skilled attention is required, still has proven unsatisfactory, in that little or no separation takes place within the limits of refinery economy. In other words, in the ordinary refinery practice separation must take place relatively rapidly, usually within less than two hours, and often within less than one hour. This is true for various reasons, but there is one reason alone which is sufficient, and that is, in order to obtain chemical demulsification, one usually must heat the oil; and in order to prevent the loss of heat units, it is necessary that such heated oil be transferred to the furnace and fractionating still without delay, so that there will not be any marked heat loss. This is diametrically opposite to the practice which is employed in the oil fields. In oil field practice emulsified oil may be heated to any desirable temperature, and may require twenty four hours for separation. The fact that the heat units are lost during such long period is absolutely immaterial, because the oil must be cooled in any event before it is marketable. For this reason procedures which are satisfactory in oil field practice fail utterly in desalting practice, for the reason indicated, i. e., inability to produce a rapid break.

In order to avoid heat losses, as has been previously pointed out, separation must be relatively fast in ordinary refinery practice. It also must be rapid for another reason, and that is, that space is not available, as a rule, to permit long periods of settling, such as are feasible and commonly used in oil field practice concerned with the resolution of cut or roily oil. The importance of all this, of course, is appreciated to a greater degree when one realizes that the through-put of the average refinery is much greater than the through-put of an ordinary field treating plant.

I have found that water-soluble impurities may be rapidly and cheaply removed from petroleum, provided added salt-free water is dispersed into the oil to form a mixture in which the major proportion of original brine particles co-exist with but are not combined with droplets of added water, and further, provided that such mixture is subsequently subjected, in the presence of a chemical demulsifier, to a period of gentle agitation of the kind hereinafter to be described. The period of gentle agitation must be sufficiently long to insure proper operation, and will be found usually to lie in the range of one-half minute to fifteen minutes, and preferably two minutes or more.

In the herein described process which constitutes my present invention, the fresh water is added to the oil stream in a predetermined and controlled amount and is then dispersed or mixed into the oil in such a manner that actual physical mixing of fresh water and original brine does not take place to any great extent. In such an emulsion, the original brine droplets contained in the oil retain their identity and are present in substantially their original concentration and undiluted by the added fresh water, which is dispersed into the oil in the form of separate droplets. To state it in another way, my process contemplates mixing the fresh water with the oil in such a manner and in such proportions as to cause a major portion of the original water droplets to co-exist with the droplets of the added water, without however, causing a predominant portion of the impurities in the original water droplets to become immediately associated or combined with the fresh added water.

The final emulsion obtained after dispersion of the fresh water is an unusual one, since it contains two kinds of dispersed phase—one consisting of original brine droplets, and one consisting of relatively salt-free water. The emulsion resulting from this type of dispersion, and containing chemical demulsifier, generally will partially separate on long standing at elevated temperatures; but the aqueous phase settling out will be found to consist mainly of fresh water, while the oil phase retains most of its original salt content in the form of emulsified brine.

If, however, this prepared dispersion containing chemical demulsifier is subjected to a period of gentle agitation of the kind to be described, and is then permitted to settle quietly, separation of phases takes place rapidly and efficiently to leave a relatively salt-free oil. In this case the treated oil, after separation of the dispersion, still may have a water content as high or even somewhat higher than the original untreated crude, but much of the small amount of residual emulsion in the treated oil consists of the added fresh water, rather than the original brine. By this procedure, then, efficient removal of water-soluble impurities is effected without the necessity of resorting to the difficult process of extreme dehydration.

In those rare cases where the oil contains dispersed particles of solid salt or other solid water-soluble impurities, the proper emulsification of the fresh water in the oil will yield a dispersion again containing two kinds of dispersed phase, solid salt and fresh water. In some instances both solid salt and brine may be present in the pipeline oil. Here, addition of fresh water can lead to the formation of a dispersion containing three internal phases.

Any suitable means may be employed to bring about this admixture, dispersion or emulsification of the kind described. Sometimes the natural passage or commingling of the fluids as they are forced through a pump will be sufficient. A convenient and easily controlled method of obtaining the desired dispersion is to pass the fluids through a so-called globe valve or weighted pressure relief valve giving a predetermined and functionally satisfactory pressure drop. In other instances, the passage of the fluids through orifice plates, baffle pipes or pieces of equipment such as heat exchangers or small coils, may be used to obtain satisfactory dispersion. The agitation required to obtain the desired dispersion or emulsion is generally relatively violent or vigorous. It must be sufficiently intense to cause distribution or dispersion of the added fresh water into smaller droplets, but not so intense as to result in shearing of many of the small brine droplets originally present in the oil.

I have found that the droplet sizes of dispersed salt-free water may vary over quite wide limits; but best results are usually obtained if the water is dispersed sufficiently to give an average particle size of about 3 mu to 200 mu in diameter. Such reference to size obviously does not apply to every droplet dispersed in the oil, but to the greater proportion of droplets. As previously mentioned, satisfactory results may be obtained with emulsions having a wide range of particle sizes; and it is immaterial whether the emulsion is relatively homogeneous or not.

Having obtained the desired dispersion of fresh water in oil to form an emulsion containing two kinds of dispersed aqueous phase, the next step in my process is one of subjecting said emulsion, in the presence of a chemical demulsifier, to a period of gentle agitation. It is a surprising fact that the use or employment of this step converts an otherwise unsuccessful, or at best, inefficient process into a highly successful and economical one. As is well known, agitation of two immiscible liquids tends to emulsify one within the other; and it is almost unpredictable that in the process I have devised, gentle agitation actually leads to resolution of the peculiar emulsion being treated. Because of this fact, it seems desirable to emphasize the importance of this unlooked-for accomplishment by a table giving comparative data. In the following table it is to be noted that all the conditions of treatment of a given oil are held constant in the different tests, except that the step of gentle agitation is omitted in some. The results on the first three oils were obtained from laboratory tests, while the results shown for the last two oils were obtained in actual plant operations conducted on a large scale.

| Source of petroleum | Original salt content (lbs./1,000 bbls.) | Percent fresh water added | Gallons demulsifier used per 1,000 bbls. of oil | Type of agitation preceding settling | Settling time (min.) after agitation is complete | Final salt content (lbs./1,000 bbls.) |
|---|---|---|---|---|---|---|
| Texas Panhandle | 493 | 10 | 4 | Vigorous (dispersing) | 45 | 390 |
|  |  |  |  | Vigorous plus gentle | 45 | 40.0 |
|  |  |  |  | Gentle only | 45 | 44.3 |
| East Texas | 76.5 | 10 | 1.6 | Vigouous (dispersing) | 30 | 51.0 |
|  |  |  |  | Vigorous plus gentle | 30 | 10.8 |
|  |  |  |  | Gentle only | 30 | 16.3 |
| Illinois | 110 | 10 | 5 | Vigorous (dispersing) | 30 | 61.5 |
|  |  |  |  | Vigorous plus gentle | 30 | 4.0 |
|  |  |  |  | Gentle only | 30 | 4.0 |
| Louisiana | 256 | 10 | 1.5 | Vigorous (dispersing) | 90 | 91.0 |
|  |  |  |  | Vigorous plus gentle | 90 | 16.1 |
|  |  |  |  | Gentle only | 90 | 24.0 |
| Arkansas and East Texas (blend). | 50.2 | 3 | 4 | Vigorous (dispersing) | 60 | 37.0 |
|  |  |  |  | Vigorous plus gentle | 60 | 9.5 |
|  |  |  |  | Gentle only | 60 | 19.4 |

It will be noted in the above table that fairly good salt removal results could be obtained by subjecting the mixture of oil and water, containing chemical demulsifier, to the step of gentle agitation alone, without a preliminary more violent dispersion. In this case, the first part of the gentle agitation may be considered the equivalent of the usual preliminary dispersing stage and represents an extreme case where the added fresh water is dispersed in a very coarse or loose form as particles having sizes considerably larger than corresponds to those in the preferred range of 3 mu to 200 mu. When such gentle agitation alone is used as the preliminary dispersing operation, the total time of subsequent gentle agitation usually must be increased considerably to obtain good results.

In view of the fact that the effectiveness of the entire process is dependent upon the employment of gentle agitation, under conditions which are functionally sufficient, it appears extremely desirable to describe or define gentle agitation for the purpose of its employment in the herein described process. Generally speaking, agitation of the proper kind can readily be obtained by turbulent flow through ordinary pipe and its attendant fittings. This avoids the use of additional expensive machinery or an especially prepared mixing device. Furthermore, it often happens that such gentle agitation, by means of turbulent flow, can be obtained by proper arrangement of equipment normally used in refinery processing. In any event, such arrangement can usually be obtained at only slightly additional expense by some minor adaptation or conversion of available or existing equipment. It is understood, however, that a person skilled in the art could employ any suitable means, device or method which would give gentle agitation comparable or analogous in nature to that hereinafter described in detail. It is understood that the present invention is not limited to use of gentle agitation obtained only by turbulent flow through ordinary pipe and fittings, but that any equivalent procedure is suitable.

As is well understood, the character of flow in pipes is dependent upon several variables, such as size of pipe, velocity of flow, viscosity of the fluid, and density of the fluid. The nature of the flow may be characterized by a dimensionless constant, known as the "Reynolds number." This number for flow in any particular system may be calculated from the variables which have just been mentioned, and it has been found by extensive experimentation that when this figure is greater than about 2,100, the flow is turbulent, in contradistinction to streamline or viscous flow. Where fluids flow through constrictions or through pipe fittings, such as bends and turns, the Reynolds number characterizing the agitation at these points may be estimated from a consideration of the pressure drop through these constrictions or fittings and of the actual structural arrangements. For a discussion of the Reynolds number and methods of calculating the same see "Principles of Chemical Engineering," by Walker, Lewis, McAdams and Gilliland, McGraw-Hill, 1937, page 60, et seq.

Obviously, if the flow becomes extremely turbulent, or if the pressure drop through the system becomes too abrupt, one no longer obtains the gentle agitation of the kind contemplated. Therefore, it has been found that the fluid flow, characterized by a Reynolds number larger than about 200,000, or perhaps 300,000, can no longer, for the purposes of the present invention, be considered as gentle agitation. When the Reynolds number exceeds this upper limit of 200,000 to 300,000, one obtains violent agitation, with attendant shearing action, on dispersed water droplets.

Although it may be true that it is difficult to determine the Reynolds number with extreme accuracy when the value is considerably in excess of the upper limits previously mentioned, however, examination of many devices, such as emulsifying valves, orifice plates, etc. indicates a Reynolds number so high that even though it is determined only approximately, and even though the error in determination may be substantial, yet obviously, it is of a range far beyond the indicated maximum limit. Such agitation is unsuited for the step or stage prior to separation or settling. Thus, gentle agitation, as herein contemplated, is the kind characterized by a Reynolds number of 2,100 to 300,000 or its functional equivalent.

The water employed in my process should be as free from inorganic salts as possible. In actual practice one must employ the most suitable water which happens to be available at the particular installation. In such circumstances the fresh water may, in fact, carry minor or unobjectionable quantities of salts. There is no fixed rule as to the amount of water which shall be added, but generally speaking, it approximates five to twenty times the amount of brine which is present, or, in a general way, it approximates 3% to 10% by volume of the pipeline oil being subjected to treatment. Factors which determine the amount of water are cost of water, ease of disposal, salt content of the crude to be treated, and loss of heat units in draw-off water, unless such heat units can be utilized in a suitable manner. It is unusual to obtain effective treatment with less than 2% of added water, and it is unusual to find circumstances which require more than 10% of added water.

The terms "fresh water" and "salt-free water" have been used throughout the previous discussion to describe the water added to the oil in my process, and it has been pointed out that as pure water as possible should be used in the process. However, in some instances it may become necessary or desirable for reasons of economy or convenience to use a water of relatively high salt content, or a so-called brackish or hard water. In some instances some of the water settling out in the settling vessel employed in the present process may be mixed with fresh water, and this mixture then added to the oil entering the salt-removal system. In this case, part of the water used in the process is recycled. However, in all such cases as these where other than strictly fresh water is employed, the concentration in such water of those compounds which are to be removed from the oil must be lower than the concentration of these same constituents in the brine forming the dispersed phase in the pipeline oil. In other words, the water added in the process should be more free of the impurities to be removed from the oil than is the dispersed aqueous phase in the original oil. The terms "fresh water" and "salt-free water," as used in the claims, will be intended to include such water as above described.

Where somewhat brackish or hard water is employed in the process, results usually will not be quite as good as where the same volume of strictly fresh water is used.

The chemical demulsifier used in my process may be added at three different points in the process, i. e., to the pipeline oil before the dispersion of fresh water therein, to the fresh water before its dispersion in the oil, or to the mixture of oil and water prior to its passage through the gentle agitation zone. In some cases the demulsifier may be added at more than one of these points. Experience has shown that addition of the demulsifier to the oil prior to introduction of the fresh water usually leads to the most effective removal of water-soluble impurities; but this is not invariably so.

The selection of the proper demulsifying agent is best determined by an adaptation of the methods commonly employed in selecting a demulsifying agent for the ordinary cut or roily oil. The same type of demulsifying agents employed in the resolution of roily oil and obviously suitable for this particular purpose, since the function of the reagent is the same, to wit, the resolution of a water-in-oil emulsion, in which the continuous phase is ordinary crude oil. The methods of selecting the most suitable demulsifier for cut oil or roily oil are well known and recorded in the literature. Broadly speaking, such conventional demulsifiers belong to various classes of organic chemical compounds, and particularly include petroleum sulfonates of the water-soluble and oil-soluble type; sulfonated rosins; sulfo-abietin; sulfonated amides; modified fatty acids obtained by the sulfonation or sulfation of fatty acids or fatty materials, followed by hydrolytic and polymerization steps; hydroxylated amides; Twitchell reagent type compounds; products obtained by oxidation or blowing of various oils, particularly selected vegetable oils; acylated or halogenated fatty bodies; quaternary ammonium compounds; alkyl-aryl sulfonic acid salts; derivatives of fatty materials, in combination with polybasic acids, such as oxalic acid or phthalic acid, and particularly, when further combined with various glycerols or amines; alkylated hydroaromatic bodies of the sulfo type; sulfonated amines; acylated cation-active compounds; materials akin to synthetic tanning agents, and derived by sulfonation of aromatic bodies and aldehydes or ketones; acylated diamines, etc. My preference is to use an oil-soluble demulsifier, particularly one of the multiple type, i. e., one obtained by admixture of two different types of demulsifiers, rather than one consisting only of members of a single class or species.

In testing various demulsifiers one naturally may add the demulsifier in suitable form to either the oil or to the fresh water prior to admixture, or one may add the demulsifier to the admixed conglomerate. In any event, however, one cannot test the demulsifier or make a comparison between various demulsifiers, unless the testing procedure includes a step of gentle agitation just prior to settling. In such experimentation one can use one of a number of various commercially available laboratory shaking or mixing machines of the kind which are adjustable, so as to give different degrees of agitation.

In actual plant practice temperatures of the oil and water employed in a desalting operation may vary considerably. However, it has been found from actual experience that better admixture of a chemical demulsifier, better commingling of the oil and water, and more rapid sedimentation takes place if the temperatures are relatively high. After the chemical demulsifier has been mixed with the water and oil and the whole subjected to a period of gentle agitation, it is then settled for a short period of time, or for a length of time sufficient for separation of the aqueous phase. All other things being equal, the temperature at which this settling is allowed to take place should be as high as possible, without being so high as to cause a violent vaporization and attendant agitation in the settler under the existing pressure. Average temperatures may vary from 160° F. to 300° F. Pressure in the settler may be less than atmospheric, or preferably, greater than atmospheric, that is operating under conditions that will show a gauge pressure of 5 to 200 lbs. with 10 to 100 lbs. as the usual range, but sufficiently high to prevent vaporization and attendant turbulence in the settler.

No description is necessary for indicating a suitable means for heating either the water or oil. Needless to say, the same means are employed as would be used for other purposes. The water may be heated by any suitable means, and the oil may be heated by any device of the kind regularly employed in refinery practice. The chemical demulsifier may be added by any suitable means, such as a proportional pump, metering device, lubricator, etc. As a means of obtaining gentle agitation, I have found it most desirable to use a circuit of ordinary pipe varying from 2 to 8 or 10 inches in diameter, depending upon the fluid through-put, so as to give a Reynolds number of approximate range of 5,000 to 50,000. Settling may take place in any suitable vessel, with a suitable inlet to receive the mixture of liquids after the period of gentle agitation, provided, of course, that there is the proper outlet for the draw-off water and for the desalted oil. Such vessel, of course, would be so constructed as to withstand the accompanying pressure, if any. As to the period of gentle agitation, as previously pointed out, it may vary from one-half minute to fifteen or more minutes; but I prefer to use whatever period appears as the result of the natural path through the plane circuit, unless such period is not sufficient; and in that event, I prefer to increase the period of gentle agitation to the value which produces rapid settling in the subsequent stage. Generally speaking, gentle agitation for a period of two to five minutes is sufficient.

In view of what has been said previously, it appears that further description as to the most suitable manner of carrying out my process is unnecessary. However, it may be desirable to indicate the nature of the steps in an ordinary plant, which, of course, may be changed or adapted to meet particular needs. Reference to the drawing is made hereinbelow:

In the accompanying drawing I have illustrated an apparatus that may be used for practising my process above described. In said drawing the reference character 1 designates a storage tank of suitable capacity for holding fresh water, 2 designates a similar storage tank, of larger capacity, adapted to hold pipe line oil, 3 designates a relatively small container for the storage of a liquid demulsifier or solution of the demulsifier, 4 designates a metering pump which adds the chemical demulsifier at some predetermined ratio, sometimes as much as one part of demulsifier to 10,000 parts of pipeline oil, and in other instances as little as one part of demulsifier to 50,000 parts of pipeline oil, or less, 5 designates a measuring device to determine the fresh water through-put, 6 designates a similar measuring device to determine the pipeline oil through-put, 7 designates a pump to actuate the movement of fresh water, 8 designates a similar pump to move the pipeline oil, 9 designates a heater of the conventional type for heating pipeline oil to any predetermined temperature, as previously indicated, 10 designates a similar heater for fresh water, and 11 designates a thermometer to record the temperature of the heated pipeline oil.

In said drawing the reference character 12 designates a similar thermometer to record the temperature of the heated fresh water, 13 designates a check valve to insure the forward flow of the pipeline oil, 14 designates a check valve to insure the forward flow of fresh water, 13ª designates the junction inlet of heated pipeline oil and fresh water into the emulsifying valve, 14ª designates the fresh water line to the junction point, 15 designates an adjustable emulsifying valve of the balanced pressure type, which may be opened completely to act as a by-pass or conduit, if desired, 15a designates an outlet from the emulsifying valve, and 16, 17 and 18 designate valves to determine or regulate the length and time of circuit through the gentle agitation zone.

The said apparatus is equipped with any suitable means that will give one or more zones of gentle agitation, such, for example, as a pipe circuit 22, 23 and 24, that gives one zone of gentle agitation, and a separate and distinct pipe circuit 19, 20 and 21 that gives a second zone of gentle agitation. The reference character 25 designates the outlet from the gentle agitation zone and inlet to settler, 26 designates the settling tank and generally operates under pressure, 26 designates the inside conduit to the distributor shoe, 27 designates the distributor shoe to prevent undue turbulence, 29 designates a pressure gauge to measure the pressure in the settler, 30 designates a relief valve for the protection of the settler, 31 designates a separated waste water outlet to the sump, 32 designates the control valve for the waste water outlet, 33 designates the desalted pipeline oil outlet to the still, 34 designates a sampling valve for obtaining a sample of desalted pipeline oil as it goes to the still, 35 designates a sampling valve to measure the height of the settled water layer, 36 designates a thermometer to record the temperature of the outgoing desalted pipeline oil, and 40 designates the upper surface of separated oil phase.

Actual operation, of course, is obvious from the previous description. When the operation is started it may be well to add considerably more demulsifier than is actually required. In other words, as oil is pumped from tank 2 to heater 9, the chemical is injected from the reservoir 3 by means of the metering pump 4. Simultaneously fresh water is pumped from the storage tank 1 through the metering device 5, and pump 7 to heat exchanger, indicated by 10. The speeds of the pumps are regulated so that the metering devices 5 and 6 indicate the proper predetermined proportion. Metering pump 4 for the chemical demulsifier is regulated in the manner previously indicated. The heaters 9 and 10 are regulated so that both water and oil leave the heaters at the proper temperature, as indicated by thermometers 11 and 12. The emulsifying valve 15 is set to a properly determined pressure, and if desired, may be equipped with a sampling valve, so that a sample may be withdrawn and examined microscopically, in order to determine the particle size distribution. Valves 16 and 18 are closed, and valve 17 is permitted to remain open. The heated commingled fluids pass from outlet 15a through the circuit indicated by 17, 22, 23, 24 and 25 to the settler. When sufficient water has accumulated in the settler, it is drawn off by means of the outlet 31 and control valve 32. The proper temperature and pressure conditions in the settler are indicated by the pressure gauge 29 and thermometer 36. Samples of oil are taken from the sampler 34 and examined for salt content. The upper oil level in the settler is indicated by line 40. Such operation should be successful from the start, and should not involve difficulties, due to an excessive amount of demulsifying agent. Once operation is started, amount of demulsifying agent injected by the metering pump 4 is decreased to a predetermined amount. If desired, violent agitation for producing distribution, or emulsification, of the fresh water may be replaced by a device providing gentle agitation only. For instance, if desired, the emulsifying valve 15 may be opened wide, so that it acts only as a by-pass or outlet. Valves 16 and 18 are opened, and valve 17 closed. This then forces the fluids through a longer or double zone of gentle agitation, and the extra zone of agitation, characterized by the circuits 19, 20 and 21, although supplying only gentle agitation, is the functional equivalent of the instantaneously acting emulsifying valve, or its equivalent.

Obviously, chemical examination is required to determine if the process is working satisfactorily. For instance, generally speaking, a successful plant should remove at least 75% of the salt present in the original pipeline oil, and the absolute values of salt content should be as low as 25 lbs. per 1,000 barrels, and exceptionally good practice will often reduce the value to 20 lbs. or less per 1,000 barrels of pipeline oil. It is to be noted that methods for the analysis of the salt content of both pipeline oil and desalted oil are recorded in the literature and do not require further elaboration.

Having thus described my invention, what I claim as new and desire to secure by Letters Patent is:

1. A process for treating pipe line oil to reduce the inorganic salt content of the oil, which comprises mixing fresh water with the pipe line oil in such a manner as to produce an admixture in which a major portion of the original water droplets co-exist with but are not combined with the droplets of the added water, heating at least the oil of the admixture to bring the admixture to a suitable elevated breaking temperature, subjecting the heated admixture to a period of gentle agitation characterized by a Reynolds number of between 2100 and 300,000, for a period of from 2 to 5 minutes, to effect coalescence to a large extent of the original water droplets with the co-existing water droplets, accompanied by coalescence of the added water droplets so that the coalesced water masses will remove the greater part of the salt content of the original pipe line oil, incorporating a chemical demulsifying agent in the admixture prior to the period of gentle agitation, settling the admixture and separating the oil and water phases.

2. A process for treating pipe line oil containing less than 1% of natural brine to reduce the salt content, which comprises mixing fresh water with the pipe line oil in such a manner as to produce a mixture in which a major portion of the original brine droplets co-exist with but are not combined with droplets of the added water, heating at least the oil of the admixture to bring the admixture to a suitable elevated breaking temperature, subjecting the heated admixture to gentle agitation characterized by a Reynolds number of between 2100 and 300,000, for a period of from 2 to 5 minutes, so as to effect coalescence to a large extent of the original brine droplets with the co-existing added water droplets, accompanied by coalescence of the added water droplets so that the coalesced water masses will remove the greater part of the salt content of the original pipe line oil, incorporating a chemical demulsifying agent in the admixture prior to the period of gentle agitation, and settling the admixture and separating the oil and water phases.

3. A process for treating pipe line oil to reduce the inorganic salt content of the oil, which comprises mixing fresh water with the pipe line oil in such a manner as to produce an admixture in which a major portion of the original water droplets co-exist with but are not combined with the droplets of the added water, heating at least the oil of the admixture to bring the admixture to a suitable elevated breaking temperature, subjecting the heated admixture to gentle agitation characterized by a Reynolds number of between 2,100 and 300,000 for a period of from 2 to 5 minutes so as to effect coalescence to a large extent of the original water droplets with the co-existing added water droplets, accompanied by coalescence of the added water droplets so that the coalesced water masses will remove the greater part of the salt content of the original pipe line oil, incorporating a chemical demulsifying agent in the admixture prior to the period of gentle agitation, and settling the admixture and separating the water and oil phases.

4. A process for treating pipe line oil containing brine droplets to remove the salt content of the oil, which comprises mixing fresh water with the pipe line oil and passing the same through an emulsifying device to produce an admixture in which a major portion of the original brine droplets co-exist with but are not combined with the droplets of the added water, heating at least the oil of the admixture to bring the admixture to a suitable elevated breaking temperature, subjecting the heated admixture to a period of gentle agitation characterized by a Reynolds number of between 2,100 and 300,000 and for a period of from 2 to 5 minutes to effect coalescence to a large extent of the original brine droplets with the co-existing added water droplets, accompanied by coalescence of the added water droplets so that the coalesced water masses will remove the greater part of the salt content of the original pipe line oil, incorporating a chemical demulsifying agent in the admixture prior to the period of gentle agitation, and settling the admixture and separating the water and oil phases.

5. A process for treating pipe line oil containing brine droplets to reduce the inorganic salt content of the oil, which comprises mixing fresh water with the pipe line oil in such a manner as to produce an admixture in which the major portion of the original brine droplets co-exist but are not combined with the droplets of the added water which range in size from 3 mu to 200 mu, heating at least the oil of the admixture to bring the admixture to a suitable elevated breaking temperature, subjecting the heated admixture to a period of gentle agitation characterized by a Reynolds number of between 2,100 and 300,000, for a period of from 2 to 5 minutes, to effect coalescence to a large extent of the original brine droplets with the co-existing added water droplets, accompanied by coalescence of the added water droplets so that the coalesced water masses will remove the greater part of the salt content of the original pipe line oil, incorporating a chemical demulsifying agent in the admixture prior to the period of gentle agitation, and settling the admixture and separating the oil and water phases.

6. A process for treating pipe line oil containing droplets of brine to remove the inorganic salt content, which comprises mixing with the pipe line oil between 2 and 10% of fresh water in such a manner as to produce an admixture in which a major portion of the original brine droplets co-exist with but are not combined with the droplets of the added water, bringing the admixture to a suitable elevated breaking temperature, then subjecting the heated admixture to a period of gentle agitation characterized by a Reynolds number of between 2100 and 300,000, for a period of from 2 to 5 minutes, to effect coalescence to a large extent of the original water droplets with the coexisting added water droplets, accompanied by coalescence of the added water droplets so that the coalesced water masses will remove the greater part of the salt content of the original pipe line, incorporating a chemical demulsifying agent in the admixture prior to the period of gentle agitation, and settling the admixture and separating the oil and water phases.

7. A process for treating pipe line oil containing less than about 1% of brine to reduce the salt content, which comprises mixing the oil with from 2 to 10% by volume of fresh water, emulsifying the same so that the major portion of the original brine droplets co-exist with but are not combined with droplets of the added water, bringing the emulsion to a suitable elevated breaking temperature, subjecting the emulsion at said elevated breaking temperature to a period of gentle agitation of from 2 to 5 minutes and at a Reynolds number of 2,100 to 300,000 to effect coalescence to a large extent of the co-existing original brine droplets with the added water droplets, accompanied by coalescence of added water droplets so that the coalesced water masses will remove the greater part of salt content of the original pipe line oil, incorporating a chemical demulsifying agent in the admixture prior to the period of gentle agitation, and settling and separating the oil and water phases.

CHARLES M. BLAIR, JR.